T. J. SCARFF.
NECKTIE GUIDE.
APPLICATION FILED DEC. 23, 1911.
1,033,200.
Patented July 23, 1912.
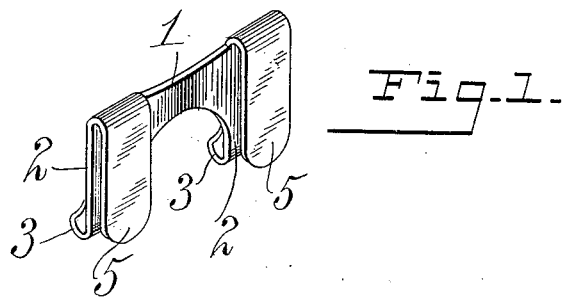
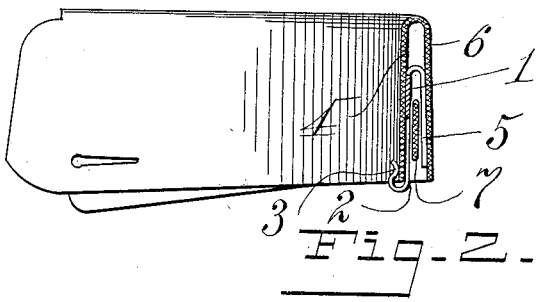
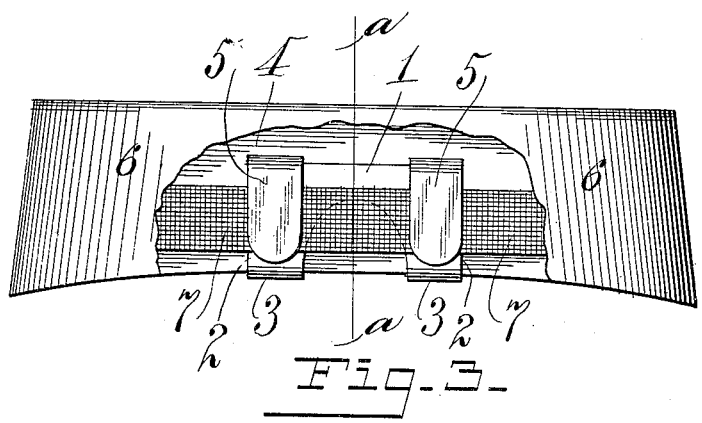
Witnesses
Inventor
Tully J. Scarff.
By R. J. McCarty.
his Attorney

UNITED STATES PATENT OFFICE.

TULLY J. SCARFF, OF NEW CARLISLE, OHIO.

NECKTIE-GUIDE.

1,033,300.  Specification of Letters Patent.  Patented July 23, 1912.

Application filed December 23, 1911. Serial No. 667,553.

*To all whom it may concern:*

Be it known that I, TULLY J. SCARFF, a citizen of the United States, residing at New Carlisle, in the county of Clark and State of Ohio, have invented certain new and useful Improvements in Necktie-Guides; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to what may be termed a necktie guide and collar spreader.

The device is especially adapted to be used between the back folds of turn-down collars, and its object is to keep the collar from binding the tie at the back, so that the tie may be freely shifted in position, preparatory to tying the same.

The function of the device is two-fold; to keep the folds of the collar separated at the rear or curve, and to provide a guide which retains the necktie and in which the tie may be freely slipped back and forth to the desired position without binding.

With the above object in view, I will now describe in detail my said invention, first referring to the accompanying drawings, of which—

Figure 1 is a perspective view of the collar spreader and neck-tie guide; Fig. 2 is a sectional view through the back of a collar showing the device in position, also the back portion of the tie in position and the outer fold of the collar held out; Fig. 3 is a rear view of a collar, a portion of the outer fold being broken away to show the spreader and guide in position.

The spreader and guide is constructed of suitable sheet metal stamped from a blank. It comprises a thin body or plate 1, having downwardly projecting arms 2, the ends of which are turned up to provide clamps 3. These clamps receive the lower edge of the inner fold 4 of the collar and the device is thus held in position. The clamps 3 have sufficient resiliency to hold firmly the portion of the collar which they grip. The arms 2 are extended to provide outer turned over portions or arms 5 which lie parallel therewith and are approximately of the same length. The over turned portions or arms 5 have a sufficient outward spread from top to bottom and are instrumental in spreading or holding the outer fold 6 of the collar outwardly at the back, as shown in Fig. 2, to keep the collar from binding the tie at the back. By thus constructing the turned over portions or arms 5 of the device and inclining them outwardly, as described, there is provided ample space between the parts 2 and 5 for the reception of the tie 7 which lies between said parts 2 and 5 and may be freely slipped in either direction with no binding effect, and no liability of slipping out. And further, owing to the outer fold of the collar being held away from the tie at the bend in the collar, said outer portion of the collar will not tighten against that portion of the tie which is not inclosed by the device. It is quite essential that the outer guide portions or arms 5 shall extend approximately the length of the inner arms 2 and diverge downwardly and outwardly therefrom in order that the tie may be kept within the guide.

I claim.

In a device of the character specified, a combined necktie guide and collar spreader, comprising a body plate 1 provided with downwardly projected arms 2 terminating in clamps adapted to receive the lower edge of the inner fold of a collar, and turned-over portions or arms 5 substantially the length of said arms 2 and diverging downwardly and outwardly from the top to the bottom, whereby the outer fold of the collar at the back is held away from the tie and space is provided between said inner and outer arms 2 and 5 for the reception of the tie and between which the tie may be freely shifted.

In testimony whereof I affix my signature, in presence of two witnesses.

TULLY J. SCARFF.

Witnesses:
 LAURA C. SCARFF,
 R. J. McCARTY.